United States Patent
Weast (10) Patent No.: US 7,370,217 B2
(45) Date of Patent: May 6, 2008

(54) REGULATING FILE SYSTEM DEVICE ACCESS

(75) Inventor: John C. Weast, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 622 days.

(21) Appl. No.: 09/991,164

(22) Filed: Nov. 16, 2001

(65) Prior Publication Data

US 2003/0097493 A1 May 22, 2003

(51) Int. Cl.
*G06F 1/32* (2006.01)

(52) U.S. Cl. ............................. 713/320; 713/300

(58) Field of Classification Search ................ 710/5; 713/1, 2, 300, 340, 320
See application file for complete search history.

(56) References Cited

U.S. PATENT DOCUMENTS

| | | | |
|---|---|---|---|
| 5,734,894 A * | 3/1998 | Adamson et al. ............ 707/200 |
| 5,812,883 A * | 9/1998 | Rao ............................ 710/74 |
| 5,815,648 A * | 9/1998 | Giovannetti .................. 714/5 |
| 5,978,921 A * | 11/1999 | Ryu ............................ 713/300 |
| 6,049,879 A * | 4/2000 | Davis et al. .................. 713/300 |
| 6,092,209 A | 7/2000 | Holzhammer et al. |
| 6,181,103 B1 | 1/2001 | Chen |
| 6,243,817 B1 * | 6/2001 | Melo et al. .................. 713/300 |
| 6,243,821 B1 | 6/2001 | Reneris |
| 6,282,662 B1 | 8/2001 | Zeller et al. |
| 6,282,663 B1 | 8/2001 | Khazam |
| 6,288,521 B1 | 9/2001 | Meador |
| 6,329,796 B1 | 12/2001 | Popescu |
| 6,347,377 B2 | 2/2002 | Barbee |
| 6,412,045 B1 * | 6/2002 | DeKoning et al. ........... 711/135 |
| 6,415,359 B1 * | 7/2002 | Kimura et al. .............. 711/137 |
| 6,442,647 B1 * | 8/2002 | Morton et al. .............. 711/112 |
| 6,622,252 B1 * | 9/2003 | Klaassen et al. ............ 713/320 |
| 6,624,962 B1 * | 9/2003 | Kodama et al. ............ 360/75 |
| 6,647,499 B1 * | 11/2003 | Morcom ..................... 713/300 |
| 6,711,686 B1 * | 3/2004 | Barrett ........................ 709/221 |
| 6,715,054 B2 * | 3/2004 | Yamamoto ................... 711/170 |
| 6,807,595 B2 * | 10/2004 | Khan et al. .................. 710/260 |
| 6,826,630 B2 * | 11/2004 | Olds et al. .................. 710/6 |
| 2002/0019874 A1 * | 2/2002 | Borr ............................ 709/229 |

(Continued)

OTHER PUBLICATIONS

Youssef, Rashad, "RAID for Mobile Computers", Aug. 1995.*

(Continued)

*Primary Examiner*—Rehana Perveen
*Assistant Examiner*—Tse Chen
(74) *Attorney, Agent, or Firm*—Joni D. Stutman-Horn (57) ABSTRACT

Device write operations may be controlled by receiving a request to perform a write operation to a device and determining whether the device is activated or inactivated. If the device activated, the device may be accessed to perform the requested write operation. If the device is inactivated, the write operation may be buffered to physical memory. Device read operations may be controlled by receiving a request from a process to read a portion of a file from a device and determining whether a limited power condition exists. If a limited power condition does not exist, the device is accessed to read the requested file portion into memory. If a limited power condition exists, the device is accessed to read a superset (either the entire file or less than the entire file) of the requested file portion into memory.

40 Claims, 5 Drawing Sheets

U.S. PATENT DOCUMENTS

2002/0091902 A1* 7/2002 Hirofuji ............... 711/133
2003/0003908 A1* 1/2003 McGrew et al. ............ 455/426
2003/0093645 A1* 5/2003 Wong et al. ................ 711/216

OTHER PUBLICATIONS

RAM disk, Webopedia.com.
Nielsen, "How to use a Ramdisk for Linux", The Computer Underground.
Advanced Power Management (APM), BIOS Interface Specification, Rev. 1.2, Feb. 1996.
Advanced Configuration and Power Interface Specification, Revision 2.0 Errata, Apr. 13, 2001.
Advanced Configuration and Power Interface Specification, Revision 2.0, Jul. 27, 2000.
http://foldoc.doc.ic.ac.uk/foldoc/foldoc.cgi?RAM=disk, RAM disk from FOLDOC.

* cited by examiner

REGULATING FILE SYSTEM DEVICE ACCESS

BACKGROUND

The present application describes systems and techniques for regulating access to file system devices in a computer system, for example, a mobile computing platform such as a laptop computer or a hand-held computer.

A typical laptop computer includes one or more file system devices through which files such as application files, data files, operating system files, and the like can be accessed—for example, written or read. Such file system devices include non-volatile data storage devices such as disk drives (e.g., hard disk, floppy disk, zip drive, CD or DVD drive, or non-volatile memory components such as flash cards) as well as other devices such as network interface adapters, or any other network access devices, which typically do not themselves store data but rather serve as a conduit through which file write and/or read requests are communicated to a data storage resource on a network.

Many users rely on their mobile computers for performing computing tasks, for example, running application programs such as word processors, spread-sheet programs, graphic presentation programs and the like, in the absence of the wall-socket AC power sources that are present in virtually all offices and homes. Consequently, a mobile user by necessity often relies on battery power for operating his or her mobile computer. Many users discover, however, that the battery life of their mobile computer is less than they would optimally desire. A mobile user on a long-distance flight may, for example, experience a lapse in battery life, and thus be forced to cease using the computer, while only half-way through the flight. This may be particularly true if the user is operating devices in the mobile computer such as disk drives, which typically exhibit a relatively high level of power consumption compared to other devices in the system.

In an effort to extend battery lifetime, several computer and/or operating system manufactures have developed utilities that enable users to regulate the behavior of their mobile computers while operating under battery power. These utilities can control properties such as screen brightness levels and the length of a hard drive time-out period—that is, the time duration of hard drive inactivity that may occur before the hard drive is forced to power down or otherwise assume a reduced power state.

In addition to the manufacturer-specific implementations of power saving utilities, various organizations have published specifications relating to power management. For example, Intel Corp. and Microsoft Corp. jointly published a power management specification entitled "Advanced Power Management (APM): BIOS Interface Specification," Rev. 1.2, February 1996. Another specification, "Advanced Configuration and Power Interface Specification," Rev. 2.0, Jul. 27, 2000, was published jointly by Compaq Computer Corp., Intel Corp., Microsoft Corp., Phoenix Technologies Ltd. and Toshiba Corp.

Details of one or more embodiments are set forth in the accompanying drawings and the description below. Other features and advantages will be apparent from the description and drawings, and from the claims.

DETAILED DESCRIPTION

The present inventor recognized that conventional power management techniques tended to provide inadequate solutions for conserving or otherwise managing battery power in mobile computing platforms. In particular, the present inventor recognized that access to file system devices while on battery power appeared to be performed by applications and/or the operating system in a sub-optimal manner. For example, when operating a mobile computer system under battery power, the hard disk, which previously had timed-out and deactivated to conserve power, may unexpectedly spin up and/or go through a series of spin up/spin down sequences. Either of these occurrences may waste power and shorten battery lifetime. Accordingly, systems and techniques as described herein have been developed that provide a robust scheme for flexibly and intelligently controlling access to file system devices, for example, depending on the power state of the device to be accessed. As a result, the battery lifetime in a mobile computing platform may be extended while minimizing adverse effects on performance and/or functionality.

In a typical conventional system, file system requests (e.g., to read or write data) are handled by a file system driver that fulfills the requests by accessing the file system device (e.g., a disk drive, a network adapter, etc.) to read and/or write data as appropriate. If the computer system is operating on battery power and the device has been powered down or otherwise deactivated (e.g., due to the lapse of a time-out condition), typically the device first must be powered up or otherwise activated before the file system request can be fulfilled.

Figure 1:
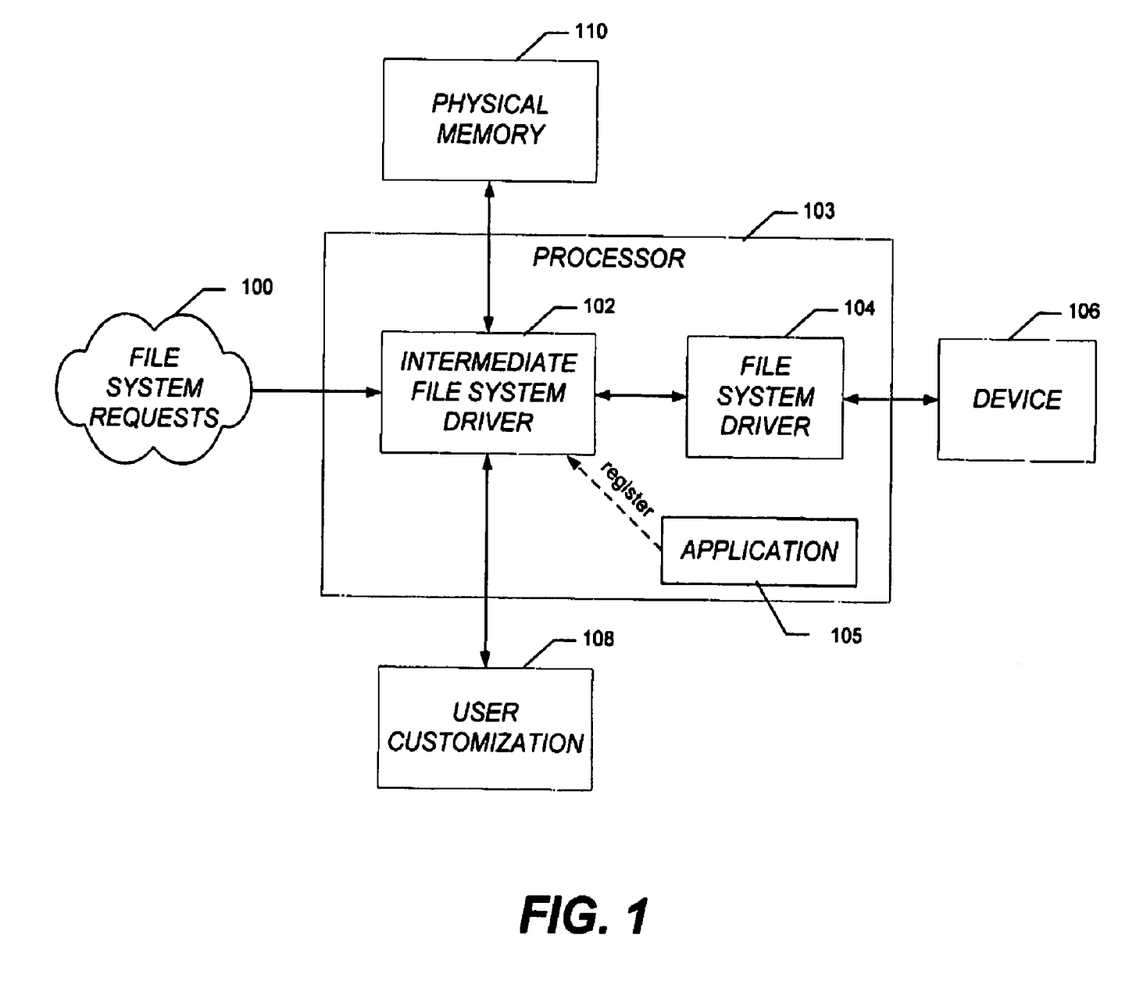
FIG. 1 is a block diagram of an implementation for regulating access to a file system device.

FIG. 1 is a block diagram of an implementation for regulating access to a file system device in a manner that may help to minimize unnecessary device access operations and/or unnecessary device activation-deactivation operations, and thus may help to conserve battery power in a mobile computing platform. As shown in FIG. 1, file system requests 100 ordinarily handled by a file system driver (FSD) 104 may be intercepted and handled in the first instance by an intermediate FSD 102, which may be implemented as a software component running in conjunction with the operating system running on a processor 103. Alternatively, the functionality of the intermediate FSD could be implemented in a variety of ways—e.g., as a native functionality of the operating system. Generally speaking, implementation of an intermediate FSD or its functional equivalent is platform specific. Regulating access to a file system device also could be implemented as a native functionality of the storage device itself, for example, by including appropriate software, firmware and/or hardware in a storage device such as a hard-drive.

By intercepting file system requests 100, the intermediate FSD 102 may intelligently and flexibly fulfill the requests in a manner that minimizes device access operations and/or device activation-deactivation operations, thereby potentially conserving power or other resources. For example, the intermediate FSD 102 can intercept file system write requests and selectively buffer them to physical memory 110 (e.g., one or more semiconductor-based memory components) until a predetermined condition is detected or occurs. Such predetermined conditions may include detecting that the write buffer has become full, that a certain amount of time has passed, that the battery power is approaching or has reached a specified threshold level, that the computer system is being turned off or put in a standby state, and/or that a user, a process or the operating system has explicitly requested that the write buffer contents be committed to non-volatile storage by the device directly (e.g., in the case of the device being a disk drive) or indirectly through the device (e.g., in the case of the device being a network adapter).

Figure 1A:
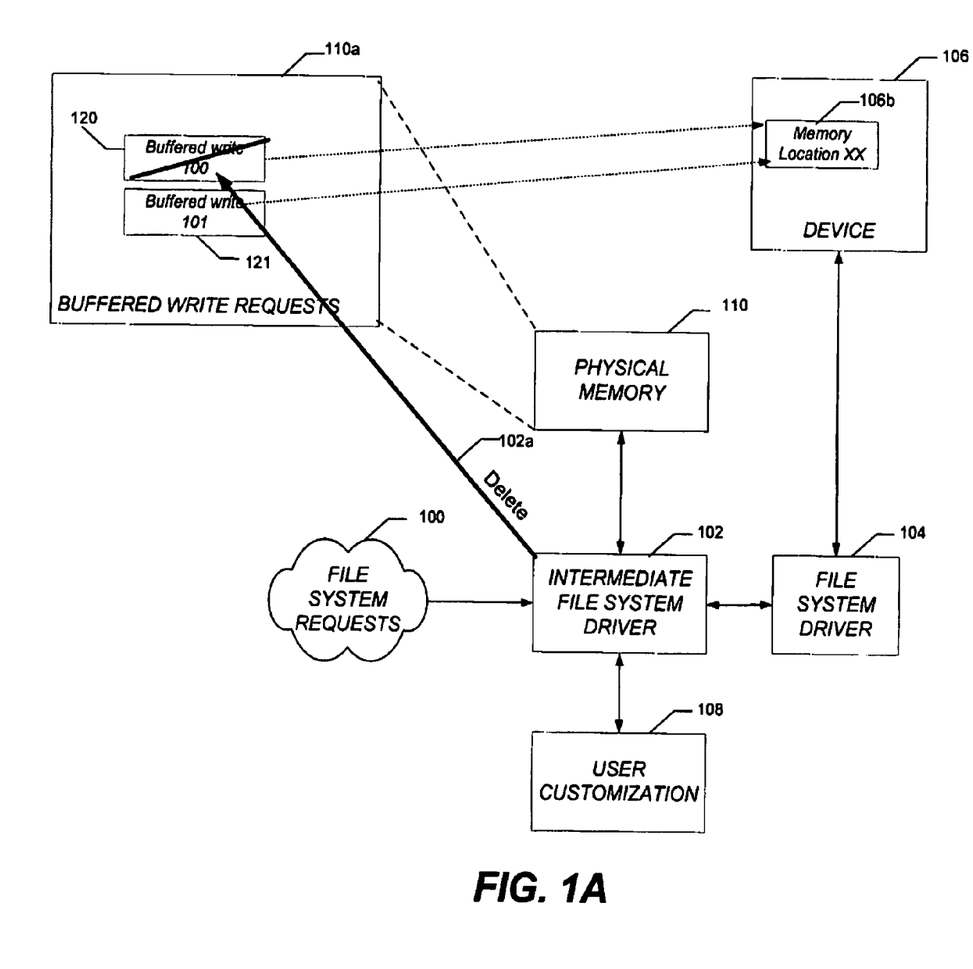

When such a predetermined condition is detected, the buffered write requests may be read from physical memory 110 (shown in more detail in 110*a*) and written to the appropriate device 106. In some situations, the buffer may include two or more write requests 120 and 121 that seek to modify the exact same memory locations 106*b* in the storage device 106. For example, a first write request 120 may seek to modify a storage location XX 106*b* to hold the data value 100 and a second, subsequent (i.e., later in time) write request 121 may seek to modify that exact same memory location XX 106*b* to hold the data value 101. In this example, buffering and committing all of the write requests in the order received would produce correct results but would be inefficient in that location XX first would be modified to hold 100 but then would be overwritten almost immediately to hold 101.

Accordingly, buffering write requests can be performed intelligently, for example, by deleting 102*a* an earlier write request 120 from the buffer when a subsequent write request 121 to the same storage location is intercepted and buffered. As a result, the size of the buffer remains smaller than it otherwise would if all write requests to identical storage locations were buffered. Moreover, committing the buffered write requests can be performed more quickly and efficiently since potentially fewer write requests may need to be performed.

Selectively buffering write requests can be performed on a process-specific or case-by-case basis. For example, certain applications (e.g., application programs such as Microsoft Word or Microsoft PowerPoint) 105 could selectively register with the intermediate FSD 102 (e.g., by reference to a specific application program interface (API) call associated with the intermediate FSD 102) to identify themselves as participating in the selective buffering scheme. Such applications could register, for example, such that only select file types are subject to selective buffering of write requests or all write requests from that application type are subject to selective buffering.

Other processes (e.g., vital system utilities or the operating system itself) could, depending on the user's and/or designer's preferences, choose to be or deemed to be exempt from the selective buffering scheme altogether, in which case file system requests 100 may be passed on to and handled by the FSD 104 directly in a conventional manner. Further, a process could register to participate in the intermediate FSD buffering scheme for some file system requests but not others depending, for example, on state or context.

Optionally, a user customization interface 108 (e.g., a Ring 3 application that communicates with a user through a graphical user interface (GUI)) could be provided to enable users of the computer system to specify one or more parameters or characteristics of the selective buffering scheme described here. Such parameters may include items such as which applications or processes are to participate in, or be excluded from, the buffering scheme, buffer size, time-out periods, and/or specific conditions under which the selective buffering should be employed or bypassed. For example, the user customization interface 108 may enable the user to specify circumstances under which a file write request will not be buffered but rather will force a device access to commit the data to non-volatile storage. These conditions may include, for example, an occurrence of a user's explicitly choosing the "save" command from the application's menu structure, a specified percentage of the document being changed, a specified volume of data being buffered, a specified number of writes being buffered, the battery's power level reaching a specified threshold, and/or the passage of a specified amount of time since the last committing of the buffer's contents to non-volatile storage. In general, the user customization interface 108 may allow a user to override any settings, defaults or other conditions that may have come about as a result of interactions among the various software components in the system (e.g., operating system, application programs, utilities, etc.).

The implementation of FIG. 1 may be used alternatively, or in addition, for selectively caching data to fulfill file system read requests while operating, for example, in a limited power state (e.g., while the laptop computer is operating under battery power). As a result, device access operations and/or device activation-deactivation operations typically caused by file system read requests may be minimized, thereby potentially conserving power or other resources. For example, if the device 106 is deactivated, a file system read request 100 directed at the device 106 may be intercepted by the intermediate FSD and fulfilled by accessing physical memory 110 if the data already has been cached. Alternatively, if the requested data has not yet been read from the device 106 cached to physical memory 110, then the intermediate FSD 102 may cause the device to become active (e.g., powered up) and read not only the requested data to fulfill the read request but also a superset of the data logically related to the requested data. This superset may be either the entire file or less than the entire file, depending on usage, context and computing environment conditions (e.g., physical memory size, device access time, etc.).

For example, if a file system request 100 seeking only a portion of a file (e.g., an application program such as MS PowerPoint or a data file such as a user-defined presentation) is intercepted, the intermediate FSD 102 may read the entire file from the device 106 and cache the file to physical memory 110. Subsequent file system read requests 100 for other portions of the file then may be fulfilled by reference to the physical memory 110, and the device 106 can be deactivated either as a result of a time-out or in response to a specific command from the intermediate FSD 102 to do so. In either case, to ensure maximum power savings benefit, the device typically should be kept deactivated for as long as feasible to do so.

Certain processes or file system requests may choose to be, or deemed to be, exempt from the selective caching scheme. Moreover, the user customization interface 108 may enable users to specify parameters relating to such selective caching such as such as which applications-or processes are to participate in the caching scheme, cache size, time-out periods, and the like.

By selectively buffering file system write requests and/or read requests in the manners described, the implementation of FIG. 1 may provide several advantages. For example, non-critical disk drive writes, which would otherwise cause a deactivated disk drive to power up, may be buffered in physical memory for as long as feasible—that is, until a condition arose that required the buffered writes to be committed to disk. In the interim, if a process or application requests to read a file or sector that was previously written to the buffer, the data can be returned from physical memory. On the other hand, file system requests deemed to be critical (e.g., from a system driver) could be exempted from the buffering scheme and allowed to proceed in usual fashion in order to ensure the system's continued health.

In addition, disk drive spin-up/spin-down sequences that may be experienced when reading different portions of a file may be minimized by reading the entire file into physical memory cache in response to the first such read request and then fulfilling subsequent read requests from the cached file. In general, a mobile computer operating under the implementation of FIG. 1 may minimize the number of device activation-deactivation sequences thereby extending battery lifetime. Reducing the number of activation-deactivation sequences also may provide other benefits such as extending a disk drive's time between failures, and reducing data access latency.

Figure 2:
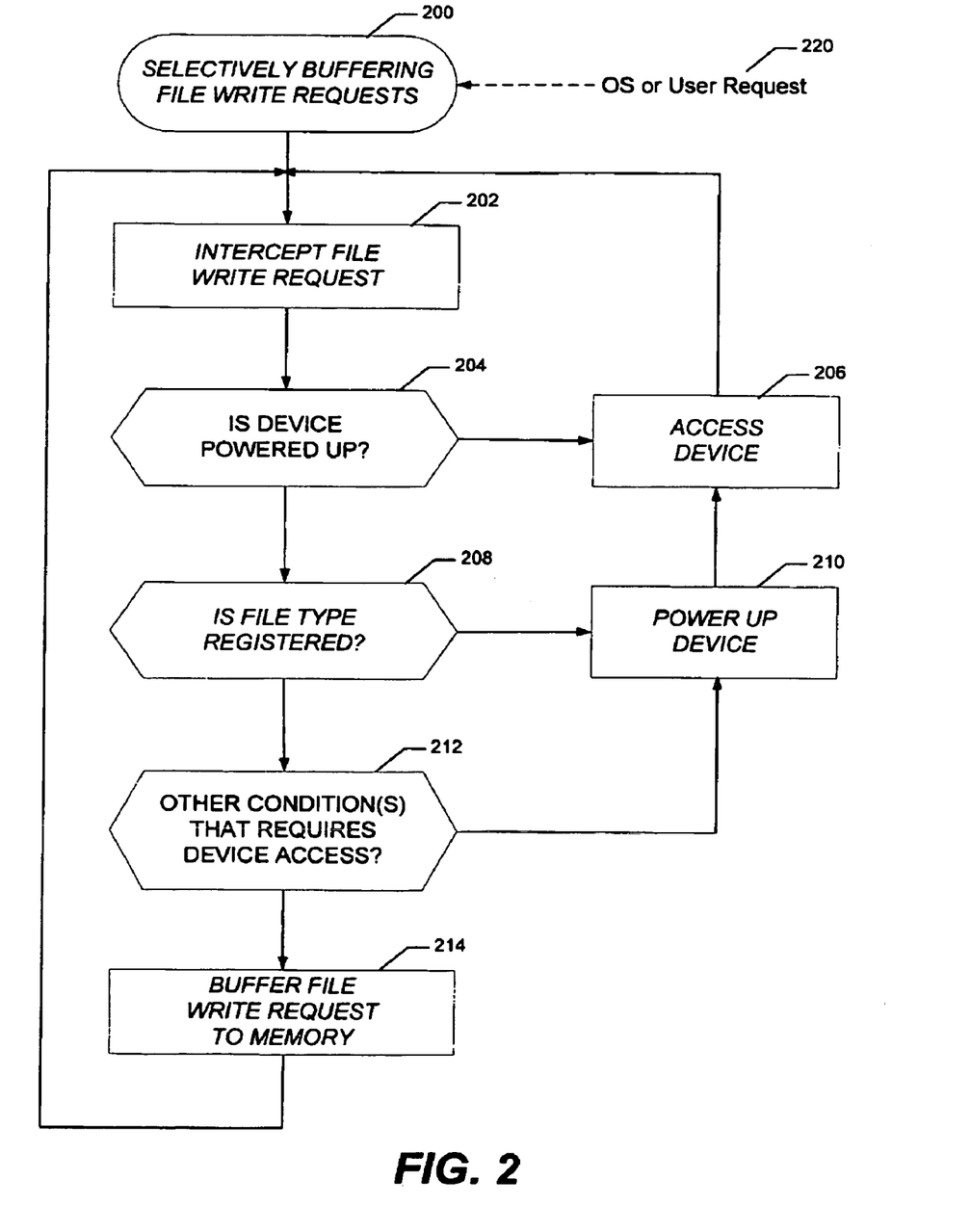
FIG. 2 is a flowchart of a process for selectively buffering file write requests.

FIG. 2 is a flowchart of a process 200 for selectively buffering file write requests. The process 200 could be executed by a mobile computing platform whenever it is determined that a limited power condition exists, for example, when operating under battery power.

First, a file write request seeking to write data to a device is intercepted (e.g., in the case of an intermediate FSD implementation) or otherwise directed to the appropriate process (e.g., in the case of an enhanced operating system functionality) (202). Next, the process 200 determines whether the device under consideration already is activated, for example, powered-up (204). If so, the device may be accessed in the usual manner to fulfill the write request (206). If not, the process 200 determines whether the file type of the file write request is registered with the process 200 as participating in the selective buffering scheme (208). If not, the device is activated (e.g., powered up) (210) and accessed (206) to fulfill the write request.

Next, the process 200 determines whether one or more other conditions may exist that require the device to be accessed to fulfill the write request (212). As noted previously, examples of such conditions may include detecting that the write buffer has become full, that a certain amount of time has passed, that the battery power is approaching or has reached a specified threshold level, that the computer system is being turned off or put in a standby state, and/or that a user, a process or the operating system has explicitly requested (220) that the write buffer contents be committed to non-volatile storage. Committing the buffer contents to non-volatile storage in this manner is not limited to being performed only as a part of the process 200 but rather may be performed whenever one or more predetermined conditions are detected.

If one or more of these other conditions is detected, the device is powered up (210) and accessed (206) to fulfill the write request. Otherwise, the file write request is buffered to physical memory (214) and resides there until a predetermined condition is detected, at which time the buffered write requests are committed to non-volatile storage. While residing in physical memory, buffered write requests may be accessed, for example, to fulfill read requests seeking access to the buffered data.

The techniques and systems described here also may be used with file systems that have a native capability for buffering or caching file system requests. In Microsoft Windows NT File System (NTFS), for example, file system write requests can be buffered and then periodically committed to disk. The buffering performed by NTFS, however, is performed without regard to a power state of the disk. Accordingly, NTFS could have a number of writes buffered, then due to inactivity that exceeds the disk time-out period, the disk may be powered down only to have to be powered up again, potentially seconds or minutes later, as soon as it is time again for NTFS to commit the buffered writes to disk. When operating under battery power or otherwise under a limited power condition, such potentially unnecessary disk power-up/power-down sequences may waste power and reduce battery life.

Figure 3:
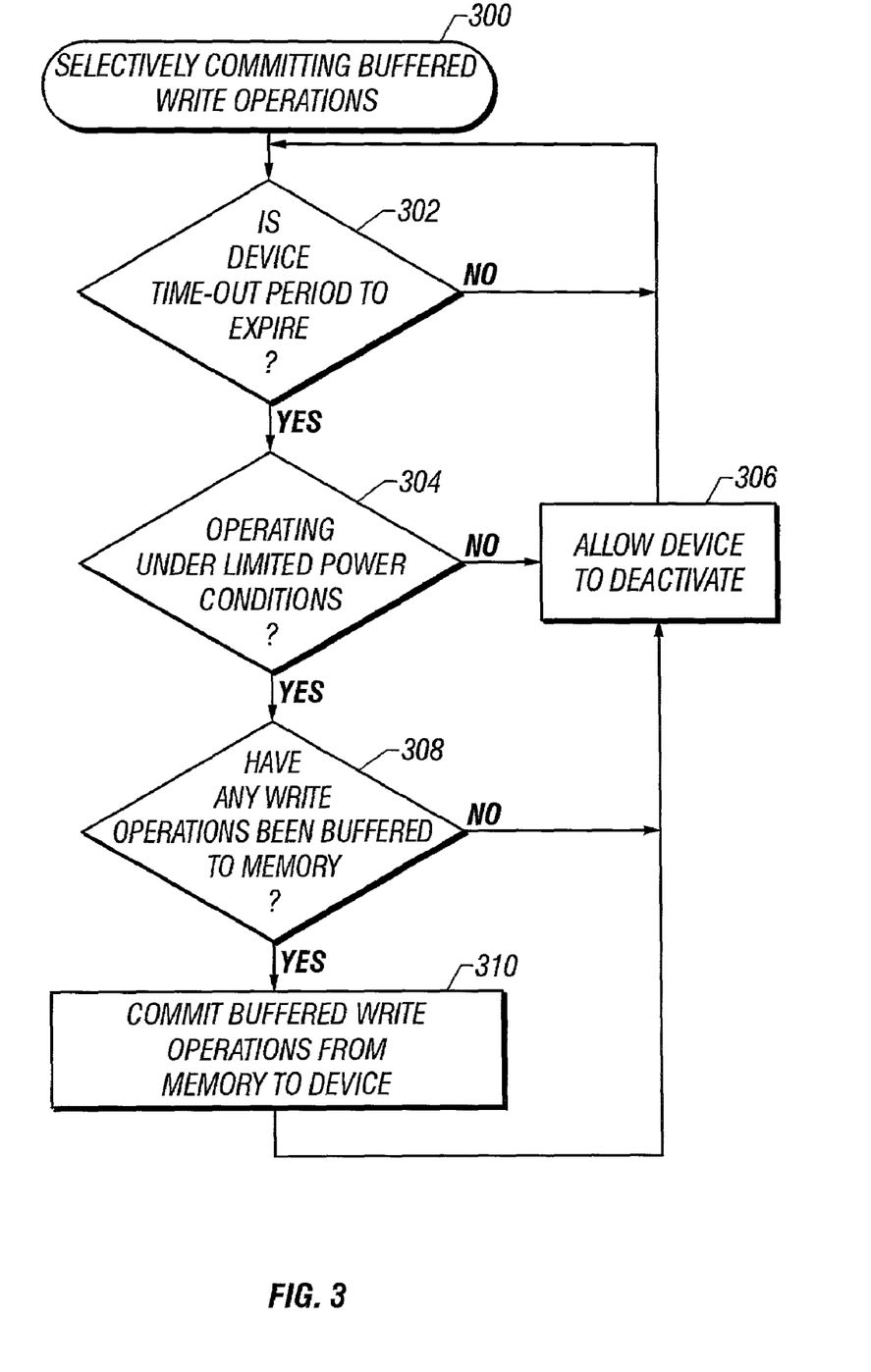
FIG. 3 is a flowchart of a process for selectively committing buffered write operations to a file system device such as a disk drive or network adapter.

FIG. 3 is a flowchart of a process 300 for selectively committing buffered write operations to a file system device, such as a disk drive or network adapter, in a manner that may take into account power state. As shown in FIG. 3, the process 300 waits until the device's time-out period is to expire (302), indicating that the device is to be powered-down or otherwise deactivated according to parameter settings in the system's power manager. Next, the process 300 determines whether the system is operating under limited power conditions, such as operating on battery power (304). If not, the device is allowed to deactivate in the usual manner. If so, the process 300 determines whether any write operations have been buffered to physical memory since the last commit operation (308). If not, it means that there is nothing in the write buffer to commit to disk, so the disk is allowed to deactivate (306). On the other hand, if it is determined that one or more write operations have been buffered, then the buffered writes are retrieved from the buffer and committed to the device (310) before the device is allowed to deactivate (306).

The processes illustrated in FIGS. 2 and 3 could be modified in various manners while still achieving advantageous results. In particular, the order of operations could be altered and/or additional or different operations could be performed instead. For example, the process of selectively buffering write requests to physical memory could be configured such that any buffered write requests are committed to non-volatile storage at a convenient or otherwise opportune time. If, for example, the device becomes activated as a result of a critical device access request initiated, e.g., by a system driver or the operating system, then the selective buffering process could take advantage of the device's active state by writing the buffered files to the device at that time rather than waiting for the occurrence of another condition.

Figure 4:
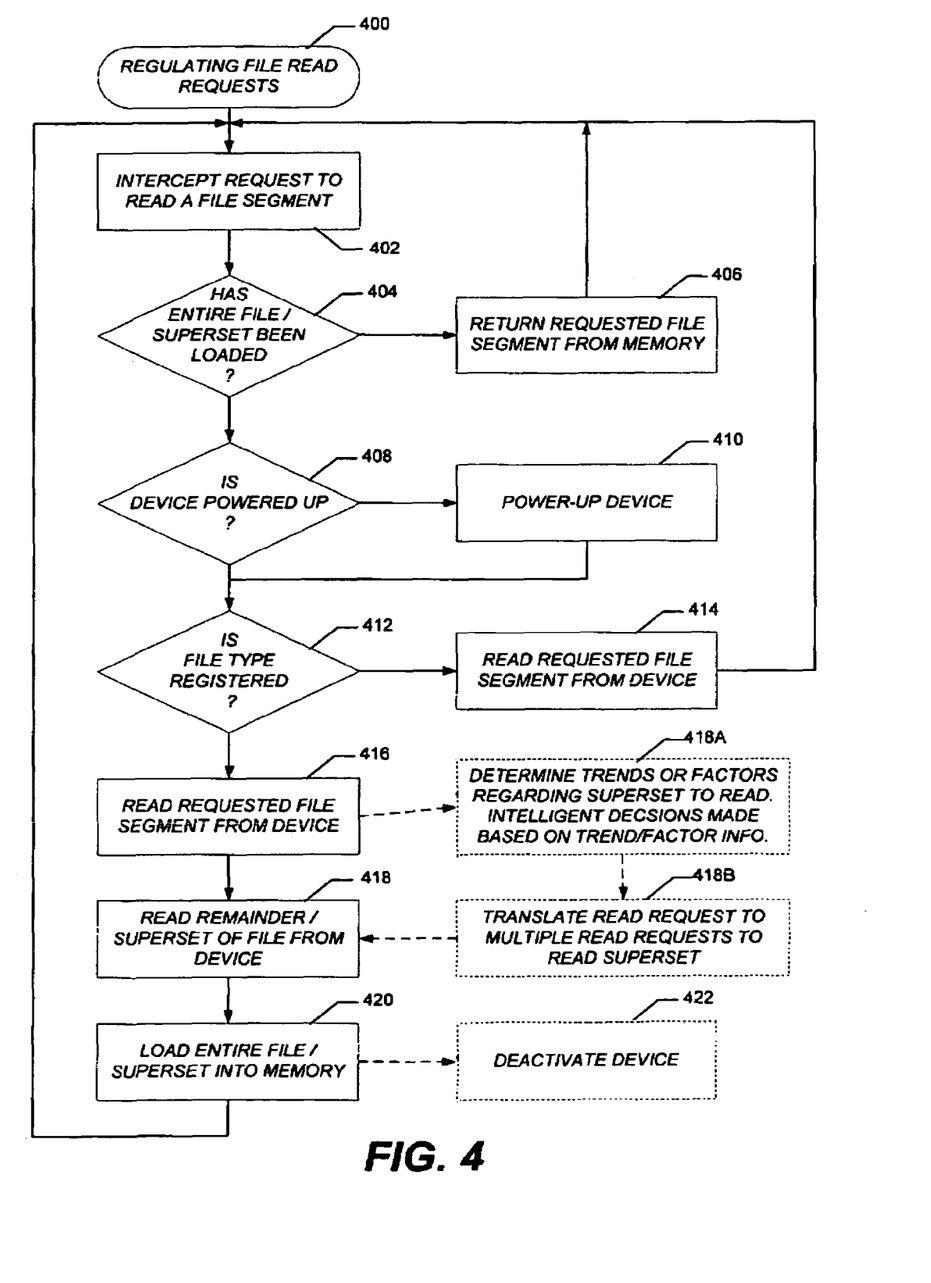
FIG. 4 is a flowchart of a process for regulating file read requests from a file system device such as a disk drive or network adapter.

FIG. 4 is a flowchart of a process 400 for regulating file read requests from a file system device such as a disk drive or network adapter. The process 400 may be used for implementing a selectively file caching technique that may reduce a number of device activation-deactivation sequences while operating in a limited power state.

First, the process 400 intercepts a request to read a file segment from a specified device (402), for example, a portion of an application program corresponding to a function that is being invoked, or a portion of a content file that is to be displayed. Next, the process 400 determines whether the entire file already has been read from disk and loaded into physical memory (404). If not, the process 400 next determines whether the device (e.g., a disk drive) is powered-up or otherwise activated (408) and, if not, powers-up the device (410). Next, the process 400 determines whether the file type of the requested file is registered (412)—e.g., designated by the user or otherwise as participating in the selective caching scheme. A particular file type may be deemed to be registered either if the file type is registered as an independent entity, or if the file system request came from an application for which all file system requests are to be treated as subject to the selective file caching technique.

If the file type is not registered, then the requested file segment is read from the device in the usual manner (414). On the other hand, if the file type is registered, then the process 400 reads the requested file segment from the device (416) and returns it to the requesting process or application. Then, the remainder of the file is read from the device (418) and the entire file is loaded into a portion of physical memory used the selective caching process (420). In the implementation shown in FIG. 4, the requested file segment is read first and returned before the remainder of the file is read and stored in order to minimize undue delays in returning the requested memory portion. However, other implementations could function differently, for example, the entire file contents could be read from the device first and then the requested file portion could be returned.

After the entire file has been read and stored in physical memory, the process 400 can fulfill subsequent file system read requests relating to that file from memory without having to access the device. Consequently, the process 400 optionally can deactivate the device immediately after reading the entire file from the device in block 422. In any event, the next time that a file system read request is intercepted seeking a portion of the cached file (402) and the process 400 confirms that the entire file has been loaded into physical memory (404), the process 400 can return the requested file segment from memory (406) without having to activate or access the device.

Variations of, or modifications to, the process 400 may be implemented advantageously depending on context and usage. For example, rather than reading in the remainder of the entire file in (418), the process 400 may read in less than the entire file, e.g., a superset of the requested file portion but, at the same time, a subset of the entire file. This superset may be logically related to the portion of the file read to fulfill the read request. This practice may be useful where a file, such as a relational database file, is too large or otherwise impractical to be read entirely into available physical memory.

For example, assume that the intercepted read request (402) is a request to read a row from a table in a 300 MegaByte (MB) relational database file. In that case, the entire 300 MB file generally is too large to be read entirely and stored in a typical computer system's physical memory. Instead, the process 400 may read in not only the requested row from the database file, but also an additional portion of the database file that is likely to be accessed by future read requests, in block 418. The amount of the file to be read into physical memory may depend on one or more factors, including available physical memory space, user defined parameters, file size and the like, as may be determined by a component making intelligent decisions, in block 418A. For instance, the additional portions of the file to be read into physical memory may be chosen intelligently, for example, using predictive caching techniques or the like. In the database file example, the additional portions to be read (i.e., the superset of the requested file portion) may include adjacent rows, the entire table, and/or other logically related information fields. In this regard, a file access monitor process could be implemented that keeps track of, and identifies trends relating to, which files, and which portions of files, have been accessed recently, e.g., for the last 3-4 days or so. The intelligent decisions as to which file portions to be read into physical memory by process 400 could be based on the information collected and maintained by the file access monitor, in block 418A. In some cases. reading the superset of the requested file portion into memory requires translating the received read request for the file portion into a plurality of read requests (418B that collectively cause the superset to be read from the device. Alternatively, or in addition, a secondary memory paging manager (discussed below) could use information from the file access monitor to make intelligent decisions about which page or pages are to be removed from physical memory, e.g., in order to accommodate additional portions of a file read in response to an intercepted read request.

The process 400 may provide several advantages. For example, in a conventional file system implementation, application files, and/or content files, typically may be read from disk in a piecemeal manner—for example, a series of disk read operations may be performed to read in different portions of the application file corresponding to different application functions as they are invoked. This piecemeal approach, as a result, tends to increase the likelihood that a user will experience multiple disk activation-deactivation sequences, each of which may contribute to decreased battery life. Assume, for example, that a user is giving a PowerPoint slide presentation while on battery power, the user spends five minutes speaking about each slide, and the disk time-out period is set to three minutes in an effort to conserve battery power. In a conventional file system implementation, each slide change under this scenario typically would result in a separate disk deactivation-activation sequence. When several such deactivation-activation sequences occur during the course of a multiple slide presentation, the cumulative effect may be to reduce battery lifetime considerably.

In contrast, the selective caching technique illustrated in FIG. 4 if used in this scenario typically could require only a single disk deactivation-activation sequence and thus may result in a significant power savings. Many or possibly even most of the computer systems being sold and/or currently in place have sufficient physical memory to load and store entire application files. A typical computer system, for example, having 256 MB of physical memory might have seven different applications open concurrently and still use only about 140 MB of actual memory (physical plus virtual) leaving about 116 MB of physical memory available for caching applications or other files. Of course, these numbers may vary considerably depending on various factors such as the computer's memory configuration, operating system, processor speed, etc.

Once the entire file, or selected portions thereof, are cached in physical memory, the disk or other device can be deactivated and typically need not be activated again while using the cached application. Under this scheme, further read requests may be intercepted and fulfilled from physical memory thereby leaving the disk spun down to conserve power.

Additional or different features or functionalities may be implemented. For example, statistics about access to specific system calls and/or libraries could be gathered and used to selectively cache frequently accessed resources to physical memory and/or to make intelligent decisions about which additional portions of a file are to be cached in response to an intercepted file request. For example, on a Microsoft Windows platform, if a specific library file residing on disk, e.g., network.dll, is accessed frequently by one or more processes, whether an application, a system driver or another type of process, then the entire file (or selected portions thereof) could be cached to physical memory thereby minimizing, or eliminating, the need to subsequently activate the disk to access this file.

Alternatively, or in addition, the various applications registered to participate in the selective buffering/caching schemes could be accorded (e.g., by the user through the user customization interface) relative priorities that could be used in making buffering/caching decisions. For example, a secondary memory paging manager could be implemented that overrides memory paging decisions (e.g., deciding which page of memory to load into and/or remove from physical memory) depending on the relative caching priority of currently executing applications. The secondary memory paging manager may ensure that, for file system read requests initiated by registered file types and/or application types, the resulting memory pages read from disk are stored in physical memory rather than in virtual memory (which typically would be back on the disk). In contrast, the secondary memory paging manager may choose to store read memory pages resulting from unregistered file types or applications in virtual memory. Further, when physical memory is full or nearly so, the secondary paging manager could use relative (e.g., user-specified) caching priorities of registered file types/applications to decide which corresponding memory pages are to be stored in physical memory and which may be relegated to virtual memory.

In addition, the secondary memory paging manager may override or otherwise influence physical memory "victim" decisions—that is, decisions as to which page or pages to be removed from physical memory when the need arises. MS PowerPoint, for example, could be assigned a higher priority because it may be more likely to require frequent disk accesses to read in application instructions or file data. In this example accordingly if PowerPoint is running as the same time as a lower priority application, the secondary memory paging manager may influence physical memory victim decisions to keep the higher priority PowerPoint memory page reads in physical memory for as long as feasible, while allowing the memory pages associated with lower priority applications to be removed from physical memory. More generally, if multiple applications are registered to participate and are running concurrently and not enough physical memory exists to cache all of them, their relative priorities could be used to decide which are cached and which are not.

The above systems and techniques also may find application in systems other than mobile computing platforms. For example, by minimizing the occurrence of device activation/deactivation sequences, the techniques described here may increase the hardware lifetime and/or mean time between failures of devices residing in either mobile or stationary systems. In addition, in stationary systems such as disk farms and the like that have relatively large power requirements, these techniques may be used to reduce the cumulative amount of time that the disks are activated, thereby potentially realizing significant power and cost savings.

Various implementations of the systems and techniques described here may be realized in computer hardware, firmware, software, or combinations thereof, or in digital electronic circuitry, integrated circuitry, field programmable gate arrays (FGPAs), specially designed ASICs (application specific integrated circuits).

Other embodiments may be within the scope of the following claims.

What is claimed is:

1. A method comprising:
receiving a request on a platform having a battery mode to perform a write operation to a file system device;
determining whether the file system device is activated or inactivated;
if the file system device is determined to be activated, accessing the file system device to perform the requested write operation; and
if the file system device is determined to be inactivated, buffering the write operation to physical memory, wherein accesses to the file system device are via a file system driver and requests to the file system driver are intercepted by an intermediate file system driver to receive user customized parameters and to receive file system requests, the intermediate file system driver to determine read/write policy for controlling access to the file system driver based on user customized parameters, wherein the user customized parameters identify whether a process is exempt from buffering, wherein the file system driver accesses the file system device in accordance with the read/write policy, and wherein the read/write policy is to maximize power saving while minimizing at least one of (a) unnecessary device access operations and (b) unnecessary device activation-deactivation operations,
thereby extending battery life of the platform while minimizing adverse effects on performance and/or functionality of the platform.

2. A method comprising:
receiving a request in a host processor to perform a write operation to a device communicatively coupled to the host processor;
determining whether the device is activated or inactivated;
if the device is determined to be activated, accessing the device via a file system driver to perform the requested write operation;
if the device is determined to be inactivated, buffering the write operation to physical memory coupled to the host processor, by an intermediate file system driver (FSD) executing on the host processor, wherein the intermediate file system driver is to receive user customized parameters and to receive file system requests, the intermediate file system driver to determined read/write policy for controlling access to the file system driver based on the user customized parameters, wherein file system requests are to be intercepted by the intermediate file system driver, wherein the user customized parameters identify whether a process is exempt from buffering, wherein the file system driver accesses the device in accordance with the read/write policy, and wherein the read/write policy is to maximize power saving while minimizing at least one of (a) unnecessary device access operations and (b) unnecessary device activation-deactivation operations; and
determining whether the device is operating in a limited power state prior to determining whether the device is activated or inactivated, and if the device is not operating in a limited power state then performing the write operation regardless of the active/inactive state of the device, wherein if the device is in an inactive state, then activating the device before performing the write operation write operation.

3. The method of clam 2 wherein the device comprises a disk drive, a non-volatile memory component, or a network access device.

4. The method of claim 2 wherein determining whether the device is activated or inactivated comprises determining whether the device is powered-up or powered-down, respectively.

5. The method of claim 2 wherein receiving a request to perform a write operation comprises using the intermediate file system driver to intercept a request bound for a file system driver.

6. The method of claim 2 further comprising:
writing one or more buffered write operations to the device upon an occurrence of a predetermined condition, wherein if the device is determined to be inactivated, then activating the device prior to the writing.

7. A method comprising:
receiving a request in a host processor to perform a write operation to a device communicatively coupled to the host processor;
determining whether the device is activated or inactivated;
if the device is determined to be activated, accessing the device to perform the requested write operation; and
if the device is determined to be inactivated, buffering the write operation to physical memory coupled to the host processor, by an intermediate file system driver (FSD) executing on the host processor, wherein the intermediate FSD is to receive user customized parameters and to receive file system requests, the intermediate FSD to determine read/write policy for controlling access to a file system driver accessing the device based on the user customized parameters, wherein file system requests are to be intercepted by the intermediate file system driver, wherein the user customized parameters identify whether a process is exempt from buffering, wherein the file system driver accesses the device in accordance with the read/write policy, and wherein the read/write policy is to maximize power saving while minimizing at least one of (a) unnecessary device access operations and (b) unnecessary device activation-deactivation operations; and
writing one or more buffered write operations to the device upon an occurrence of a predetermined condition, wherein if the device is determined to be inactivated, then activating the device prior to the writing,
wherein the predetermined condition is identified by the intermediate FSD,
wherein the buffered write operations are stored in physical memory, and
wherein the predetermined condition comprises one or more of the following: detecting that a memory write buffer is full, detecting that a predetermined amount of rime has lapsed, detecting that a predetermined volume of data has been buffered, detecting that battery power is at a threshold level, detecting that a computer system with which the device is associated is being turned off or put in a standby state, and detecting an explicit request that the write buffer contents be committed to non-volatile storage.

8. The method of claim 7 further comprising, receiving user input requesting that the buffered write operations be committed to non-volatile storage; and
detecting an input request that the write buffer contents be committed to non-volatile storage.

9. A method comprising:
receiving, a request in a host processor to perform a write operation to a file system device communicatively coupled to the host processor;
determining whether the file system device is activated or inactivated;
if the file system device is determined to be activated, accessing the file system device to perform the requested write operation;
if the file system device is determined to be inactivated, buffering the write operation to physical memory coupled to the host processor, by in intermediate file system driver (FSD) executing on the host processor; and
determining whether the requested write operation corresponds to an entity registered with the intermediate FSD to participate in the method of controlling device write operations, the controlling being performed by the intermediate FSD, wherein if the entity is registered with the FSD, then the buffering to be controlled based on the registration, wherein select file types are subject to selective buffering of write operations or all write operations for an application type are subject to selective buffering, and wherein write operations that are not subject to selective buffering are performed without buffering.

10. A method comprising:
receiving a request in a host processor to perform a write operation to a file system device communicatively coupled to the host processor;
determining whether the file system device is activated or inactivated;
if the system device is determined to be activated; accessing the file system device to perform the requested write operation; and
if the system device is determined to be inactivated, buffering the write operation to physical memory coupled to the host processor, by an intermediate file system driver (FSD) executing on the host processor wherein the intermediate FSD is to receive user customized parameters and to receive file system requests, the intermediate FSD to determine read/write policy for controlling access to a file system driver based on the user customized parameters, wherein file system requests are to be intercepted by the intermediate FSD, wherein the user customized parameters identify whether a process is exempt from buffering, wherein the file system driver accesses the file system device in accordance with the read/write policy, and wherein the read/write policy is to maximize power saving while minimizing at least one of (a) unnecessary device access operations and (b) unnecessary device activation-deactivation operations, wherein buffering the write operation to physical memory comprises deleting from physical memory a prior buffered write operation request that seeks to modify a same storage location on the device as the write operation to be buffered.

11. A method comprising:
receiving a request from a process executing on a host processor to read a portion of a file from a device communicatively coupled to the host processor;
determining on whether a limited power condition exists;
if a limited power condition is determined not to exist, accessing the device to read the requested file portion into memory; and
if a limited power condition is determined to exist, accessing the device to read a superset of the requested file portion into memory coupled to the host processor, wherein the superset of the requested file portion is logically related to the requested portion, and wherein the superset is selectively determined by an intermediate file system driver (FSD) executing on the host processor, wherein the intermediate FSD is to receive user customized parameters and to receive file system requests, the intermediate FSD to determine read/write policy for controlling access to a file system driver based on the user customized parameters, wherein file system requests are to be intercepted by the intermediate FSD, wherein the intermediate FSD determines the superset based on the read/write policy, wherein the file system driver accesses the device in accordance with the read/write policy, and wherein the read/write policy is to maximize power saving while minimizing at least one of (a) unnecessary device access operations and (b) unnecessary device activation-deactivation operations.

12. The method of claim 11 wherein reading a superset of the requested file portion into memory comprises reading the entire file into memory.

13. The method of claim 11 wherein reading a superset of the requested file portion into memory comprises reading a subset of the entire file into memory.

14. The method of claim 13 further comprising identifying the subset of the entire file to be read into memory, and reading the subset into memory.

15. The method of claim 14 wherein identifying the subset of the entire file to be read into memory is based on one or more temporal file access trends.

16. The method of claim 11 further comprising returning the requested file portion to the requesting process.

17. The method of claim 11 wherein, if a limited power condition exists, the requested file portion is read from the device and returned to the requesting process before a remainder of the superset is read into memory.

18. The method of claim 11 wherein, when a superset of the requested file portion is read into memory, further comprising accessing the superset read into memory to fulfill a subsequent request from the process for 7 portion of the file, and when a superset of the requested file portion is not read into memory, further comprising performing an additional at read request to fulfill a subsequent request for portions of the file not read into memory.

19. The method of claim 11 further comprising, when a superset of the requested file portion is read into memory, deactivating the device.

20. The method of claim 11 wherein the device comprises a disk drive or a network access device.

21. The method of claim 11 wherein reading the superset of the requested file portion into memory comprises translating the received read request for the file portion into a plurality of read requests that collectively cause the superset to be read from the device.

22. The method of claim 11 further comprising determining whether the requested read operation corresponds to a file type registered with the intermediate file system driver to participate in the method of controlling device read operations, wherein if the entity is registered with the intermediate FSD, then the superset is selectively determined based on the registration.

23. The method of claim 22 wherein each of a plurality of file types has an associated priority and wherein the method further comprising selectively storing the superset of the requested file portion into memory based on its relative priority, wherein the selectively storing is based in part on the entity registration.

24. A system comprising:
at least one non-volatile storage device;
a physical memory; and
a processor communicatively coupled to the physical memory and the at least one non-volatile storage device, the processor to execute instructions to perform operations comprising:
detecting that a time-out period is to expire for deactivating a non-volatile storage device that provides access to data;
determining whether a limited power condition exists; and
if a limited power condition is determined to exist, writing one or more buffered write operations from physical memory to the non-volatile storage device before the non-volatile storage device is deactivated;
if a limited power condition is determined to not exist, allowing the non-volatile storage device to be deactivated when the time-out period expires,
wherein the writing is in response to an intermediate file system driver detecting that a time-out has occurred wherein the intermediate file system driver is to receive user customized parameters and to receive file system requests, the intermediate file system driver to determine read/write policy for controlling access to the file system driver based on the user customized parameters, wherein file system requests are to be intercepted by the intermediate file system driver, wherein the user customized parameters identify when a buffered write operation is to be written to the non-volatile storage device, wherein the file system driver accesses the non-volatile storage device in accordance with the read/write policy, and wherein the read/write policy is to maximize power saving while minimizing at least one of(a) unnecessary device access operations and (b) unnecessary device activation-deactivation operations.

25. The system of claim 24 wherein the non-volatile storage device that provides access to data comprises a disk drive or a network access device.

26. The system of claim 24 wherein determining whether a limited power condition exists comprises determining whether a system associated with the non-volatile storage device is operating under battery power.

27. A machine-accessible medium embodying instructions for causing a machine to perform operations comprising:
determining a power state of a non-volatile storage device;
selectively buffering a file system write request, in physical memory, the write request relating to the non-volatile storage device based on the determined power state of the non-volatile storage device; and
determining whether the device is operating in a limited power state prior to determining whether the device is activated or inactivated, and if the device is not operating in a limited power state then performing the write request regardless of the determined power state of the device,
wherein an intermediate file system driver is to receive user customized parameters and to receive file system write requests, the intermediate file system driver to determine read/write policy for controlling access to a file system driver based on the user customized parameters, wherein file system write requests are to be intercepted by the intermediate file system driver, wherein the user customized parameters identify whether a process is exempt from buffering, wherein the file system driver accesses the non-volatile storage device in accordance with the read/write policy, and wherein the read/write policy is to maximize power saving while minimizing at least one of (a) unnecessary device access operations and (b) unnecessary device activation-deactivation operations.

28. The medium of claim 27 wherein determining a power state of the non-volatile storage deuce comprises determining whether the non-volatile storage device is operating under battery power.

29. The medium of claim 28 further comprising instructions for writing one or more buffered write requests to the non-volatile storage device upon an occurrence of a detected predetermined condition, wherein the predetermined condition comprises at least one condition selected from a group of conditions consisting of (i) detecting that a write buffer has become full, (ii) detecting that a certain amount of time has passed, (iii) detecting that battery power is approaching a specified threshold level, (iv) detecting that the machine is being turned off, (v) detecting that the machine is to be put in a standby state, and (vi) detecting that one of a user, a process and an operating system has explicitly requested that the write buffer contents be committed to non-volatile storage by the device, and predetermined condition is not detected, maintaining the buffered file system write in physical memory until the predetermined condition is detected.

30. The medium of claim 29 further comprising instructions for causing a machine to deactivate the non-volatile storage device after writing the one or more buffered write requests, the machine to continue operations after deactivating the non-volatile storage device.

31. A machine-accessible medium embodying instructions for causing a machine to perform operations comprising:

determining a power state of a device; and based on the determined power state of the device and in response to a file system request to read a portion of the file from the device, selectively reading a superset of the requested file portion from the device into physical memory, wherein the superset of the requested file portion is logically related to the requested portion, wherein an intermediate file system driver (FSD) is to receive user customized parameters and to receive file system requests, the intermediate FSD to determine read/write policy for controlling access to a file system driver based on the user customized parameters, wherein file system requests are to be intercepted by the intermediate FSD, wherein the intermediate FSD determines the superset based on the read/write policy, wherein the file system driver accesses the device in accordance with the read/write policy, and wherein the read/write policy is to maximize power saving while minimizing at least one of (a) unnecessary device access operations and (b) unnecessary device activation-deactivation operations.

32. The medium of claim 31 wherein selectively reading a superset of the requested file portion comprises reading the entire file into physical memory.

33. The medium of claim 31 wherein determining a power state of a device comprises determining whether the device is operating under battery power.

34. The medium of claim 31 wherein selectively reading a superset of the requested file portion from the device into physical memory comprises translating the file system request to read a portion of the file portion into a plurality of read requests that collectively cause the superset te be read from the device.

35. The medium of claim 31 wherein the requested file portion is read from the device and returned to a requesting process before a remainder of the superset is read into physical memory.

36. The medium of claim 31 further comprising accessing the superset read into physical memory to fulfill a subsequent file system request to read a portion of the file.

37. The medium of claim 31 further comprising instructions for causing a machine to deactivate the device after reading the superset of the requested file portion.

38. A system, comprising:

a processor communicatively coupled to physical memory;

a non-volatile storage device communicatively coupled to the processor, wherein access to the non-volatile storage device is controlled by a file system driver responsive to file system requests; and an intermediate file system driver to receive user customized parameters and to receive file system requests, the intermediate file system driver to determine read/write policy for controlling access to the file system driver based on the user customized parameters, wherein file system requests are to be intercepted by the intermediate file system driver, wherein the user customized parameters identify whether a process is exempt from buffering, wherein the file system driver accesses the non-volatile storage device in accordance with the read/write policy, and wherein the read/write policy is to maximize power saving while minimizing at least one of a (a) unnecessary device access operations and (b) unnecessary device activation-deactivation operations, wherein the intermediate file system driver intercepts a file system write request and selectively buffers the write request to physical memory, based on the read/write policy, the selective buffering to be maintained until a predetermined condition is detected, wherein responsive to the predetermined condition, the intermediate file system driver initiates performance of the write request of the buffered write request.

39. The system as recited in claim 38, wherein the read/write policy comprises a rule to delete an earlier write request from the buffer when a subsequent write request to a same storage location on the non-volatile storage device is intercepted and buffered by the intermediate file system driver.

40. The system as recited in claim 38, wherein an application executing on the processor registers with the intermediate file system driver to indicate compliance with selective buffering techniques to be used in conjunction with the read/write policy, wherein if the read/write policy of the application indicates an exemption from buffering, conventional read/write processes are performed.

* * * * *